United States Patent Office 3,769,273
Patented Oct. 30, 1973

3,769,273
BIS-UREA ADDUCTS OF MACROLIDE ANTIBIOTICS
Eddie H. Massey, Indianapolis, Ind., assignor to Eli Lilly and Company, Indianapolis, Ind.
No Drawing. Continuation-in-part of application Ser. No. 865,215, Oct. 9, 1969, which is a continuation-in-part of application Ser. No. 687,498, Dec. 4, 1967, both now abandoned. This application Oct. 20, 1971, Ser. No. 191,068
Int. Cl. C07c *129/18*
U.S. Cl. 260—210 AB        5 Claims

ABSTRACT OF THE DISCLOSURE

Bis-urea adducts prepared from macrolide antibiotics containing an aldehyde group, useful in antibiotic stabilization.

CROSS-REFERENCE

This application is a continuation-in-part application of my co-pending application Ser. No. 865,215 filed Oct. 9, 1969, now abandoned which was in turn a continuation-in-part application of my then co-pending application Ser. No. 687,498 filed Dec. 4, 1967, now abandoned.

BACKGROUND OF THE INVENTION

Several macrolide antibiotics contain an aldehyde group. These include tylosin (U.S. Pat. 3,178,341, issued May 13, 1965), members of the leucomycin series (Tetrahedron Letters, 1967, page 609), Spiramycins A, B, C, and D (U.S. Pats. 3,000,785, issued Sept. 19, 1961 and 3,105,794 issued Oct. 1, 1963), carbomycin (U.S. Pat. 2,796,379, issued June 18, 1957), carbomycin B (U.S. Pat. 2,785,104, issued Mar. 12, 1957), cirramycin J. Antibiotics 22, 89 (1969), OMT (O-mycaminosyltylonolide) (U.S. Pat. 3,459,853, issued Aug. 5, 1969), etc. These antibiotics also contain other reactive groups; for example, tylosin contains, in addition to the aldehyde group, a ketone group, a lactone group, amine groups, ether groups, and hydroxyl groups, as well as glycosidic linkages and ethylenic unsaturations. Because of the presence of such numerous reactive functions in each of the macrolide antibiotics, stability problems have arisen which have limited their therapeutic use. In particular, these macrolide antibiotics undergo a series of acidic hydrolytic reactions and are also subject to oxidative degradation. Protection of the sites subject to chemical change in the various macrolides has been the subject of considerable research in recent years.

In addition, it has been found that the treatment of ruminants with antibiotics by the oral route is affected by the fact that the rumen flora can change the nature of the antibiotic molecule. For example, it has been found that ruminant organisms have the capability of reducing the aldehyde group present in many of these macrolide antibiotics to a primary alcohol group. With the antibiotic tylosin, this transformation product is known as tylosin D (also AM–684 or relomycin, disclosed in U.S. Pat. 3,321,368, issued May 23, 1967). Tylosin D is much less active antibiotically than is tylosin and has a somewhat different antibiotic spectrum. Protection of the aldehyde group from transformations produced by rumen organisms during the therapeutic treatment of ruminants with macrolide antibiotics such as tylosin would greatly enhance the therapeutic efficacy of these antibiotics.

SUMMARY

This invention provides macrolide antibiotic-urea adducts of the following structure:

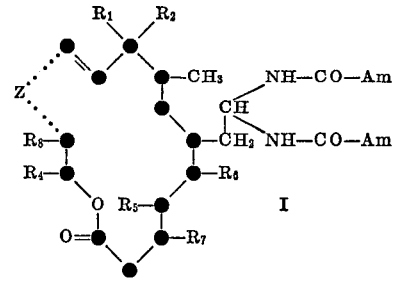

wherein,
Z is

$R_1$ when taken singly is hydrogen;
$R_2$ when taken singly is —O-forosamine;
$R_1$ and $R_2$ when taken together with the carbon to which they are attached form a keto group;
$R_3$ is hydrogen or methyl;
$R_4$ is methyl or ethyl;
$R_5$ is methyl or methoxy;
One of $R_6$ and $R_7$ is O-mycaminose-O-mycarose, O-mycaminose, or O-mycaminose-O-isovaleryl mycarose; and,
The other of $R_6$ and $R_7$ is hydrogen, hydroxy, acetoxy, or propionoxy;
$R_8$ is hydrogen, $CH_2$—O-mycinose, $CH_2$—O-desmethylmycinose, methyl, or hydroxymethyl; and
Am is —NH—$R_9$ wherein $R_9$ is a member of the group consisting of phenyl, tolyl, halophenyl and trifluoromethylphenyl; or

wherein $R_{12}$ and $R_{13}$ are the same or different members of the group consisting of hydrogen, $C_1$-$C_4$ alkyl and $C_3$-$C_4$ alkenyl, the sum of the carbon atoms in $R_{12}$ and $R_{13}$ not to exceed 4. Groups which $R_9$ can represent include o-tolyl, m-tolyl, p-tolyl, o-chloro, m-bromo, p-fluoro and the like. Groups wihch $R_{12}$ and $R_{13}$ can represent include methyl, ethyl, allyl, n-propyl, isopropyl, n-butyl and the like.

The sugars or amino sugars—mycarose, mycaminose, mycinose and forosamine—are disclosed in Kirk-Othmer: Encyclopedia of Chemical Technology, colume 12, Second Edition, page 639, John Wiley and Sons, Inc. The radicals derived from these sugars, as referred to above in defining $R_2$, $R_6$, $R_7$ and $R_8$, have the following structures with the free bond indicating the point of attachment either to the macrolide ring or to another sugar, as in the case of O-mycaminose-O-mycarose.

O-mycarose

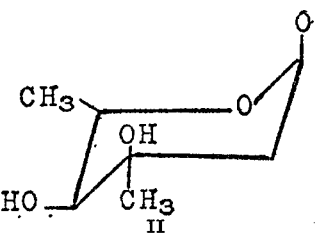

II

O-mycinose

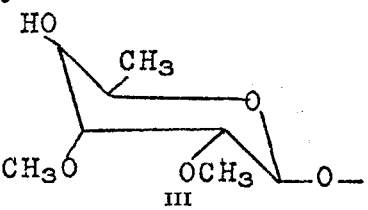

III

O-mycaminose

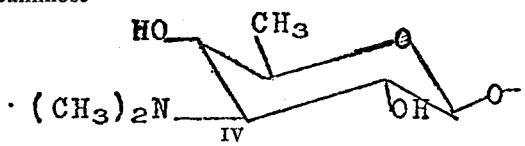

IV

O-forosamine

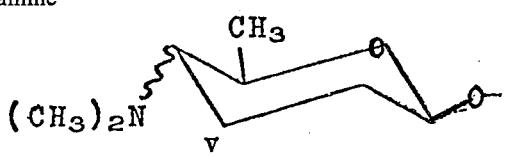

V

The term "O-mycaminose-O-mycarose" used in the above formula indicates that a mycarose molecule is substituted into mycaminose through an oxygen bridge.

Desmethyl mycinose, referred to in defining $R_8$, has the following structure:

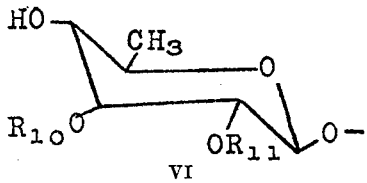

VI wherein one of $R_{10}$ and $R_{11}$ is hydrogen and the other is methyl.

O-isovaleryl mycarose, referred to in defining $R_6$ and $R_7$ has the following structure:

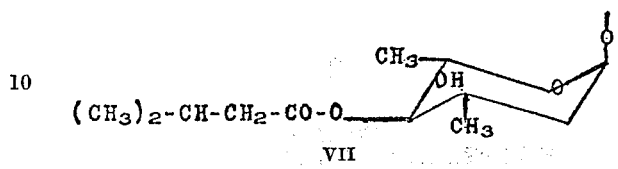

VII

Compounds represented by the Formula I above, referred to herein as adducts, are definite compositions of matter, as evidenced by the disappearance of the characteristic aldehyde hydrogen signal in the NMR spectrum of the adducts. The adducts are formed by the reaction of two moles of urea, $NH_2$—CO—Am and an aldehyde-containing macrolide antibiotic represented by the formula:

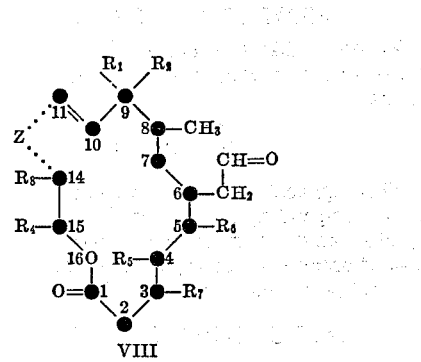

VIII wherein Z and the various R groups have the same meaning as before. A molecule of water is eliminated during the reaction.

Macrolide antibotics having the above structural characteristics are listed in the following table with the particular substituent groups for the particular antibiotic listed under the corresponding R or Z symbol.

TABLE 1

| | Z | $R_1$ and $R_2$ | $R_3$ | $R_4$ | $R_5$ | $R_6$ and $R_7$ | $R_8$ |
|---|---|---|---|---|---|---|---|
| Tylosin group: | | | | | | | |
| Tylosin | $\diagup\!=\!\diagdown^{R_3}$ | Keto | $CH_3$ | $C_2H_5$ | $CH_3$ | —O-mycaminose-O-mycarose; H | —$CH_2$—O-mycinose. |
| Desomycosin | Same as above | do | $CH_3$ | $C_2H_5$ | $CH_3$ | —O-mycaminose; H | Do. |
| Macrocin | do | do | $CH_3$ | $C_2H_5$ | $CH_3$ | —O-mycaminode-O-mycarose; H | —$CH_2$—O-desmethyl mycinose. |
| Lactanocin | do | do | $CH_3$ | $C_2H_5$ | $CH_3$ | —O-mycaminose; H | Do. |
| OMT | do | do | $CH_3$ | $C_2H_5$ | $CH_3$ | do | —$CH_2OH$. |
| Cirramycin | $\diagup\!\!\diagdown^O$ | do | $CH_3$ | $C_2H_5$ | $CH_3$ | do | $CH_3$. |
| Spiramycin group: | | | | | | | |
| Spiramycin I | $\diagup\!=\!\diagdown$ | —H; —O-forosamine. | H | $CH_3$ | $CH_3O$ | —O-mycaminose-O-mycarose; —OH | H. |
| Spiramycin II | Same as above | do | H | $CH_3$ | $CH_3O$ | —O-mycaminose-O-mycarose; —O—CO—$CH_3$. | H. |
| Spiramycin III | do | do | H | $CH_3$ | $CH_3O$ | —O-mycaminose-O-mycarose; —O—CO—$C_2H_5$. | H. |
| Leucomycin $A_1$ | do | do | H | $CH_3$ | $CH_3O$ | —O-mycaminose-O-isovaleryl mycarose; —OH. | H. |
| Leucomycin $A_3$ | do | do | H | $CH_3$ | $CH_3O$ | —O-mycaminose-O-isovaleryl mycarose; —O—CO—$CH_3$. | H. |
| Carbomycin group: | | | | | | | |
| Carbomycin B | $\diagup\!=\!\diagdown^{R_3}$ | Keto | H | $CH_3$ | $CH_3O$ | do | H |
| Niddamycin | Same as above | do | H | $CH_3$ | $CH_3O$ | —O-mycaminose-O-isovaleryl mycarose; —OH. | H |
| Carbomycin A | $\diagup\!\!\diagdown^{O\ R_3}$ | do | H | $CH_3$ | $CH_3O$ | —O-mycaminose-O-isovaleryl mycarose; —O—CO—$CH_3$ | H |

As can be seen from the above table, the antibiotics included within the scope of Formula VIII are all substituted acetaldehyde in which the substituting group is a 16-member macrolide ring. Furthermore, the immediate environment of the aldehyde group is substantially identical in each of the listed antibiotics, with the chief difference being the sugar attached at $C_5$ (or $C_3$). It is well within the skill of the art to form bis-urea adducts of other macrolide - substituted acetaldehyde having slightly different groups attached at different points of the macrolide ring or having structurally different sugars attached thereto. As can be seen from the above formula, the macrolide-substituted acetaldehyde antibiotic form a family which is constantly being augmented by isolation of new antibiotics from fermentations or by the recognition that previously isolated antibiotics contained an aldehyde group.

Ureas useful in preparing the adducts of this invention include N-methylurea, N,N-diethylurea, N-n-butylurea, N-allylurea, N-crotylurea, N-methyl-N-allylurea, N-phenylurea, N-(p-chlorophenyl)urea, N-(o-tolyl)urea, N-(p-trifluoromethylphenyl)urea and the like.

Illustrative compounds of this invention include:

Tylosin bis-(N',N'-dimethylurea)adduct
Leucomycin bis-(N'-phenylurea)adduct
Cirramycin bis-(N'-allylurea)adduct
Niddamycin bis-(N'-n-butylurea)adduct
Carbomycin B bis-(N'-isobutylurea)adduct
Lactenocin bis-(N'-methallylurea)adduct
Spiramycin I bis-(N'-p-trifluoromethylphenylurea)adduct
Spiramycin II bis-(N'-o-totylurea)adduct
Spiramycin III bis-(N'-m-bromophenylurea)adduct
Desmyocin bis-(N',N'-dimethylurea)adduct
OMT bis-(N-ethyl-N'-methylurea)adduct The bis-urea adducts of this invention are prepared by saturating aqueous or alcoholic solutions containing the macrolide antibiotic, usually in salt form, with the urea. A thick syrup results which is allowed to remain at ambient temperature until analysis, preferably thin layer chromatography, indicates that substantially all of the antibiotic product has been transformed into a bis-urea adduct. When the analytical procedure indicates that the formation of the adduct is substantially complete, the product is isolated by diluting the reaction mixture with 1–2 volumes of water, adjusting the pH of the aqueous mixture to about 9.0, and then saturating the mixture with sodium chloride. The resulting precipitate is separated by filtration or by other conventional means and is purified by dissolution in an organic solvent, usually chloroform, washing the organic layer with water, separating the organic layer and removing the solvents therefrom at reduced pressure. The resulting solid amorphous residue can then be crystallized from an anhydrous organic solvent to yield the desired adduct as a white crystalline solid.

The preparations of bis-urea adducts of specific macrolide antibiotics are illustrated below.

Example 1.—Tylosin-bis-urea adduct

One hundred grams of tylosin tartrate are dissolved in a solution containing 100 g. of urea in 100 ml. of water. The resulting mixture is allowed to stand until thin layer chromatography indicates that the formation of the adduct is substantially complete. In carrying out the thin layer chromatography, silica gel is used as the substrate with a 1:9 diethylamine-ethyl acetate solvent system. In this system, the tylosin-bis-urea adduct remains at the origin while tylosin moves closely behind the solvent front.

The tylosin-bis-urea adduct is isolated from the reaction mixture by adding two volumes of water thereto and then adjusting the pH of the solution to about pH=9 with 10 percent aqueous sodium hydroxide. Solid sodium chloride is next added until the crude tylosin-bis-urea adduct precipitates as a yellowish, gummy solid, which solid is separated by filtration. The filter cake is dissolved in chloroform and the chloroform solution washed with water and dried. The chloroform is removed therefrom at reduced pressure to yield tylosin-bis-urea adduct as a pale yellow amorphous solid which is thoroughly dried at reduced pressure to remove as much residual chloroform as possible. The dried solid is then dissolved in dry acetone at the rate of 5 ml. per gram of solid and the resulting solution is cooled. Tylosin-bis-urea adduct crystallizes as white needles which are separated by filtration. M.P.=220–222° C.

Analysis. — Calcd. for $C_{47}H_{83}N_5O_{18}$ (percent): C, 56.22; H, 8.39; N, 6.96. Found (percent): C, 56.05; H, 8.32; N, 6.72.

A nuclear magnetic resonance spectrum of the adduct shows no proton attributable to the aldehyde group. The adduct is microbiologically inactive against organisms which are routinely used to assay tylosin.

Tylosin is chemically regenerated from its bis-urea adduct by dissolving the adduct in aqueous solution maintained at a pH in the range 4–7 by means of standard buffers. Some desmycosin, an acidic hydrolysis product of tylosin, is also obtained.

Tylosin-bis-(N'-methylurea) adduct is prepared by substituting N-methylurea for urea in the above procedure.

Other ureas represented by Formula I above can be used in place of urea or N-methylurea in the above example to form bis-urea adducts with macrolide antibiotics. Among such ureas which form a bis-urea adduct are allylurea, N,N-diethylurea, ethylurea, and N-methyl-N-n-propylurea. These ureas are all soluble in water and the above procedure can be used to prepare the bis-urea adduct without modification. With other ureas, such as N-(m-tolyl)urea, N-phenylurea, N-(t-butyl)urea, and N-(p-trifluoromethylphenyl)urea, alcoholic solutions of the urea and of the tylosin salt are used instead of aqueous solutions.

Example 2.—Magnamycin-bis-urea adduct

Two grams of magnamycin are dissolved in 5.0 ml. of saturated aqueous urea solution maintained at a pH in the range 5.0–5.5 by the addition of 10 percent aqueous hydrochloric acid when needed. After standing at room temperature for 12 days, the solution is diluted with 4 volumes of water. The aqueous solution is extracted with 40 ml. portions of chloroform at the following pH's: 5.0, 5.5, 6.0, 6.5 and 7.0. The pH of the solution is adjusted as desired prior to each extraction by the addition of 10 percent aqueous sodium hydroxide. The urea adduct is present in each of these extracts, but only the extracts taken at pH=6.5 and 7.0 are substantially free from magnamycin. The extracts at these higher pH's are combined and mangamycin-bis-urea adduct isolated and purified by the method employed for tylosin-bis-urea adduct in Example 1. 0.5 g. of a white solid is obtained having a typical magnamycin spectrum in the ultraviolet $$\binom{240\ m\mu}{max.} = 13,000$$

The NMR spectrum of the adduct lacks the aldehyde proton signal. Bioassay of the bis-urea adduct shows it to be inactive against organisms employed in a standard magnamycin assay procedure.

Magnamycin is recovered from magnamycin-bis-urea adduct by autoclaving the adduct at 120° C. for 20 minutes at pH=5.

Example 3.—Spiramycin-bis-urea adduct

Two grams of spiramycin A are dissolved in 50 ml. of saturated aqueous urea solution which is maintained in the range pH 4.5–5.0 by addition of 10 percent aqueous hydrochloride acid as needed. After standing at room temperature for 12 days, the solution is diluted with 4 volumes of water and subjected to a gradient pH extraction procedure as in Example 2, except that the extracts are obtained at pH=6.0, 6.5, 7.0, 7.5, 8.0, 8.5 and 9.0. Forty milliliters of chloroform are employed for each extraction. The extracts at pH=8.0, 8.5 and 9.0 are combined to give 1.0 gram of spiramycin-bis-urea adduct as a white solid. The ultraviolet spectrum of the adduct is substantially the same as that of unreacted spiramycin A $$\left(\begin{smallmatrix}230\ m\mu\\ \max.\end{smallmatrix}=23{,}000\right)$$

The NMR spectrum is comparable to that of spiramycin A, except for the disappearance of the aldehyde proton signal.

Spiramycin-bis-urea adduct is converted back to spiramycin by dissolving 20 mg. of the adduct in 1 ml. of ethanol, adding 4 ml. of pH=5.5 buffer, and autoclaving the mixture for 20 minutes at 120° C.

Bis-urea adducts of other macrolide antibiotics containing an aldehyde group including macrocin, desmycosin, lactenocin, carbomycin, carbomycin B, niddamycin, other members of the spiramycin series and members of the leucomycin series, can be prepared in analogous fashion.

The compounds of this invention are useful as intermediates in the preparation of derivatives of the various macrolide antibiotics listed above. For example, reaction of the tylosin aldehyde group with urea to form a bis-urea adduct which is stable to alkali makes possible the reduction of the tylosin ketone group at $C_9$ in Formula I with sodium borohydride to produce, after acid hydrolysis of the two urea molecules, a novel dihydrodesmycosin or novel dihydrotylosin, depending upon the pH and time of the acid hydrolysis step of the following structure:

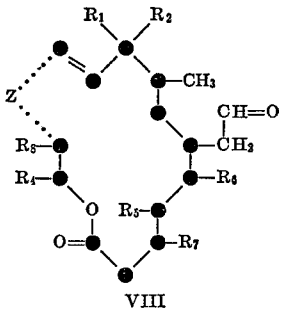

VIII wherein,

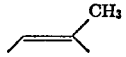

Z is
$R_1$ is H;
$R_2$ is hydroxyl;
$R_3$ and $R_5$ are methyl;
$R_4$ is ethyl;
$R_8$ is $CH_2$—O-mycinose; and
$R_6$ and $R_7$ are H and O-mycaminose-O-mycarose for dihydrotylosin or H and O-mycaminose for dihydrodesmycosin. The above dihydroreduction product cannot, of course, be prepared from tylosin or desmycosin since the aldehyde group present in these two antibiotics would reduce preferentially over the ketone group with sodium borohydride to yield a different dihydro product (relomycin in the case of tylosin). Dihydrotylosin and dihydrodesmycosin thus prepared have antibiotic spectra which are comparable to those of tylosin and desmycosin. These new antibiotic substances are used in the same way as tylosin and desmycosin in controlling growth of microorganisms such as *S. aureus, Sarcina lutea* and *B. subtilis*. Thus, for example, solutions of dihydrotylosin and dihydrodesmycosin can be used to disinfect hospital areas, laboratory glassware, etc.

Example 4.—Bis-urea adduct of dihydrotylosin

Seventeen grams of tylosin-bis-urea adduct and 650 mg. of sodium borohydride are dissolved in 450 ml. of 95 percent ethanol. The reaction mixture is allowed to stand overnight and is then diluted with 400 ml. of water. The ethanol is removed by evaporation in vacuo and the resulting aqueous solution is extracted with 100 ml. of chloroform. The chloroform layer is separated and dried, and the chloroform evaporated therefrom in vacuo to yield an amorphous, white solid as a residue. This white solid gives a single spot on thin layer chromatography. Recrystallization of the white solid from acetone yields crystalline dihydrotylosin-bis-urea adduct.

Example 5.—Dihydrodesmycosin 9.1 grams of dihydrotylosin-bis-urea adduct are dissolved in 300 ml. of water. The pH of the solution is adjusted to about 2.8 by the addition of 10 percent aqueous hydrochloric acid. The hydrolysis mixture is allowed to stand for 4 days at room temperature. Extraction of the aqueous reaction mixture with methylene dichloride is then carried out at the following pH's: 6.0, 6.5, 7.0, 8.0 and 9.0. The pH of the solution is adjusted upward for each extraction by the addition of 10 percent aqueous sodium hydroxide. Extracts at pH=7.0 and pH=8.0 are combined and show only a single spot on thin layer chromatography. Evaporation of the combined extracts yields 5.2 g. of dihydrodesmycosin as an amorphous white solid. Dissolution of the solid in the minimal amount of hot chloroform followed by slow cooling of the solution yields 2.2 g. of crystalline dihydrodesmycosin, decomposing in the range 70–80° C.

*Analysis.*—Calc. for $C_{38}H_{56}NO_{14}$ (percent): C, 60.05; H, 8.62; N, 1.84. Found (percent): C, 59.76; H, 8.48; N, 1.86.

Dihydrodesmycosin can also be prepared from dihydrotylosin-bis-urea adduct by hydrolysis at pH=3.6 at 100° C. for 1.5 hours. Extraction of the hydrolysis mixture with methylene dichloride yields the desired compound directly.

Dihydrodesmycosin inhibits the growth of *S. aureus, Sarcina lutea* and *B. subtilis* when present in the culture medium at a concentration of 10 micrograms per milliliter.

Example 6.—Dihydrotylosin

Ten grams of dihydrotylosin-bis-urea adduct are dissolved in a minimal amount of warm ethanol, and the ethanol solution diluted with 450 ml. of a pH=4.8 phosphate-citrate buffer. The pH of the solution is adjusted to 5.0 by the addition of citric acid. The solution is heated to about 90° C. for 30 minutes. Extraction of the reaction mixture with methylene dichloride at a pH in the range 5.0–5.5 (the pH being adjusted as needed with dilute sodium hydroxide) yields 5.7 g. of dihydrotylosin as a white amorphous solid. The solid gives one spot on thin layer chromatography, and the spot moves at a different rate than that of tylosin in the same system. Dihydrotylosin inhibits the growth of *S. aureus, Sarcina lutea* and *B. subtilis* when present in the culture medium at a concentration of 10 micrograms per milliliter.

As will be apparent to those skilled in the art, other derivatives of the tylosin ketone carbonyl group can be prepared in the presence of the urea-blocked aldehyde group and similar transformations can be carried out with the other macrolide antibiotics.

I claim:
1. An adduct of an aldehyde-containing macrolide antibiotic and urea of the formula:

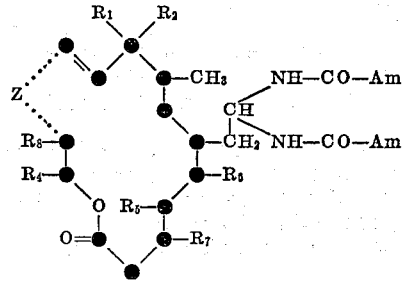

wherein,

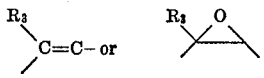

Z is

R₁ when taken singly is hydrogen;
R₂ when taken singly is —O-forosamine;
R₁ and R₂ when taken together with the carbon to which they are attached form a keto group;
R₃ is hydrogen or methyl;
R₄ is methyl or ethyl;
R₅ is methyl or methoxy;
one of R₆ and R₇ is O-mycaminose-O-mycarose, O-mycaminose, or O-mycaminose-O-isovaleryl mycarose; and
the other of R₆ and R₇ is hydrogen, hydroxy, acetoxy, or propionoxy;
R₈ is hydrogen, CH₂—O-mycinose, CH₂—O-desmethylmycinose, methyl, or hydroxymethyl; and
AM is —NH—R₉ wherein R₉ is a member of the group consisting of phenyl, tolyl, halophenyl and trifluoromethylphenyl;
or

wherein R₁₂ and R₁₃ are the same or different members of the group consisting of hydrogen, C₁–C₄ alkyl and C₃–C₄ alkenyl, the sum of the carbon atoms in R₁₂ and R₁₃ not to exceed 4.

2. A bis-urea adduct of a macrolide antibiotic according to claim 1 wherein said macrolide antibiotic is a member of the group consisting of tylosin, macrocin, desmycosin, lactenocin, carbomycin, carbomycin B, niddamycin, spiramycins I–III, cirramycin, O-mycaminosyl-tylonolide, leucomycin A₁ and leucomycin A₃.

3. A compound according to claim 1, said compound being the bis-urea adduct of tylosin.

4. A compound of the formula

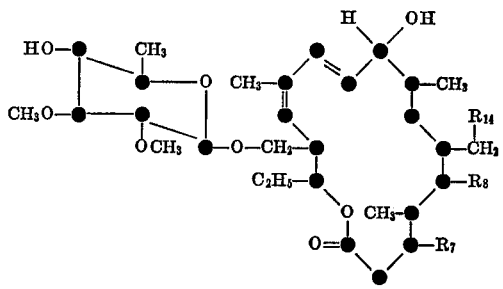

wherein, one of R₆ and R₇ is hydrogen and the other is O-mycaminose-O-mycarose or O-mycaminose;
R₁₄ is

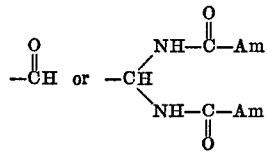

and;

Am is —NH—R₉ wherein R₉ is a member of the group consisting of phenyl, tolyl, halophenyl and trifluoromethylphenyl; or

wherein R₁₂ and R₁₃ are the same or different members of the group consisting of hydrogen, C₁–C₄ alkyl and C₃–C₄ alkenyl, the sum of the carbon atom in R₁₂ and R₁₃ not to exceed 4.

5. A compound according to claim 4, wherein R₁₄ is

and one of R₆ and R₇ is hydrogen and the other is O-mycaminose-O-mycarose, said compound being dihydrotylosin.

References Cited
UNITED STATES PATENTS 3,321,368  5/1967  Whaley et al. ____ 260—210 AB
3,535,309  10/1970  Hata et al. _____ 260—210 AB LEWIS GOTTS, Primary Examiner J. R. BROWN, Assistant Examiner U.S. Cl. X.R.

424—180

UNITED STATES PATENT AND TRADEMARK OFFICE
CERTIFICATE OF CORRECTION

PATENT NO. : 3,769,273
DATED : October 30, 1973
INVENTOR(S) : Eddie H. Massey

It is certified that error appears in the above-identified patent and that said Letters Patent are hereby corrected as shown below:

Column 4, in Table 1 at line 58, "O-mycaminode-" should read -- O-mycaminose- --.

Column 5, line 3, "acetaldehyde" should read --acetaldehydes--.

Column 5, line 9, "acetaldehyde" should read --acetaldehydes--.

Column 5, line 34, a prime (') should follow the first "N".

Column 6, line 72, "hydrochloride" should read --hydrochloric--.

Column 7, line 57, "dihydroreduction" should read --dihydro reduction--.

Column 10, in the claims, at line 29, "atom" should read --atoms--.

Signed and Sealed this

Third Day of August 1976

[SEAL]

Attest:

RUTH C. MASON
Attesting Officer

C. MARSHALL DANN
Commissioner of Patents and Trademarks